Inventor
Elkan Ronald Herman

Inventor
Elkan Ronald Herman
By Olson,
Mecklenburger, von Holst, Pendleton & Neuman Attorneys Jan. 26, 1965 E. R. HERMAN 3,167,401
INCREMENTAL HEAT TRANSFER INCLUDING DIRECT
CONTACT OF VOLATILE LIQUIDS
Filed April 14, 1961 5 Sheets-Sheet 4

Inventor
Elkan Ronald Herman
By Olson,
Mecklenburger, von Holst, Pendleton & Neuman Attorneys

3,167,401
INCREMENTAL HEAT TRANSFER INCLUDING DIRECT CONTACT OF VOLATILE LIQUIDS
Elkan Ronald Herman, Ahuza, Haifa, Israel, assignor to Chemicals & Phosphates Limited, a company of Israel
Filed Apr. 14, 1961, Ser. No. 102,971
Claims priority, application Israel, Apr. 26, 1960, 13,796
11 Claims. (Cl. 23—302)

This invention relates to heat exchange processes wherein heat is extracted from a first liquid which is thereby cooled and is transferred to a second liquid which is thereby heated.

A common way of carrying out such heat exchange has been to employ a heat exchanger, for example of the shell and tube kind, wherein the two liquids are arranged to flow in counter-current and are separated by a heat conducting surface. The use of this kind of heat exchanger is however rendered inefficient when one or both of the liquids deposit(s) heat insulating scale on the conducting surface, or when large quantities of heat are to be transferred with a low temperature gradient across the conducting surface. This is particularly undesirable when both of these factors are present or when, in addition to one or both factors, the presence of corrosive liquids necessitates the use of expensive materials for the equipment.

It is an object of the present invention to provide a heat exchange process wherein the above referred to causes for inefficiency are substantially avoided.

According to the present invention there is provided a heat exchange process for the respective cooling and heating of first and second liquids, each over temperature ranges of at least 5° C., comprising the steps of subjecting the first liquid to cooling in stages to successively lower temperature levels by evaporation therefrom in each of a plurality of cooling stages of a volatile fluid in good thermal contact therewith, subjecting the second liquid to heating in stages to successively higher temperature levels by condensation of the vapour evaporated in each cooling stage or group of stages on, or in thermal contact with, the second liquid in a corresponding one of a plurality of heating stages, separating the condensed fluid from the second liquid and returning the separated fluid to the cooling stages.

With a process in accordance with the invention the heat which is removed from the first liquid corresponds to the latent heat of evaporation of the fluid less the sensible heat of the returned condensed fluid whilst the heat which is transferred to the second liquid corresponds to the latent heat of condensation of the fluid.

It has previously been proposed to employ the evaporation and condensation of a vapour so as to effect respectively the partial freezing of pre-cooled sea water and the melting of the ice thus formed when separated from the residual concentrated brine. Such freezing and melting, however, in accordance with the previous proposal, involving as it does the transfer of heat from a lower to a higher temperature, cannot be brought about by a heat exchange process such as could be carried out with a shell and tube kind of heat exchanger. Furthermore, in this process the temperature, on the condensing side, does not change appreciably as a result of the heat transfer. This invariance of temperature is due to the fact that the heat supplied by the condensation is absorbed as a result of the melting of the ice, and the temperature level remains at substantially 0° C.

In the case of the present invention, however, heat exchange takes place between liquids which are, as a result, respectively heated and cooled over a relatively substantial range of temperature (at least 5° C.), the overall result of the process being similar to that obtainable, albeit inefficiently, with a shell and tube kind heat exchanger. Furthermore, with the evaporation and condensation being carried out in more than one stage, the work in the form of power input required to effect the heat transfer is considerably less than would be the case if the heat transfer were carried out in a single stage. This economy in power input arises in view of the following considerations.

The minimum work W which has to be supplied in order to remove a quantity of heat $Q_1$ from a lower temperature $T_1°$ K. and to transfer a quantity of heat $Q_2$ (being equal to $Q_1+W$) to an upper temperature $T_2°$ K. is given by the thermodynamic relationship:

$$W = \frac{Q_1(T_2-T_1)}{T_1} = \frac{Q_2(T_2-T_1)}{T_2}$$

For the sake of simplicity, the case will be considered of a stream of water which flows at the rate of 1 g. per unit time which is to be cooled from $T_2$ to $T_1$ by transfer of heat to a similar stream which is to be heated from $T_1$ to $T_2'$. $T_2'$ is greater than $T_2$ due to the work put into the process; if, however, $(T_2-T_1)/T_1$ is comparatively small, then the minimum work will be small in comparison with $Q_1$ and the approximation can be made that $T_2'=T_2$.

If heat transfer were now effected by evaporation and condensation in a single stage operation, then the vapour pressure of the volatile fluid on the evaporation (cooling) side would be controlled by the lowest temperature in the cooling stage, i.e., $T_1$, whilst the vapour pressure of the volatile fluid on the condensation (heating) side would correspond to the highest temperature in the heating stage, i.e., $T_2$.

Now
$$Q_1 = (T_2-T_1) \text{ calories/unit time}$$

$$W = \frac{Q_1(T_2-T_1)}{T_1} = \frac{(T_2-T_1)^2}{T_1} \text{ calories/unit time}$$

If now the heat exchange operation is divided into $n$ stages which preferably involve similar temperature gradients in each stage, then for each stage $$\text{Temperature gradient} = \frac{T_2-T_1°}{n} \text{ K.}$$

$$Q_n = \frac{(T_2-T_1)}{n} \text{ calories/unit time}$$

and now the work $w$ for each stage $$= \frac{(T_2-T_1)^2}{T_n n^2} \text{ calories/unit time}$$

where $T_n$ is the lower temperature which varies from stage to stage, but which can, in view of the fact that the temperatures involved are relatively close together and are measured on the absolute scale, be assumed to be approximately equal to $T_1$.

Therefore over $n$ stages, the total work $W_n$ is given by $nw$, i.e., $$W_n = \frac{n(T_2-T_1)^2}{T_1 n^2} = \frac{(T_2-T_1)^2}{T_1 n} = \frac{W}{n}$$

Whilst these calculations have involved the making of rather gross approximations, it can readily be seen that the power input in a plurality of stages is a fraction of that required for one stage and that this power input decreases as the number of stages increases. It must be remembered, however, that after a certain number of stages, increases in equipment costs begin to outweigh the economies in power input and therefore for each set of operating circumstances an optimum number of stages exists.

A particularly advantageous application of a heat exchange process in accordance with the present invention is in connection with the pre-cooling stage of the desalination of sea water by a freezing process. Preferably, the actual freezing of the pre-cooled sea water is carried out by a flash evaporation process such as that referred to above as forming part of a previous proposal. Thus, a heat exchange process in accordance with the invention can be used to cool down the sea water from a temperature of about 20° C. to a temperature of about 0° C., whilst at the same time heating up the streams of pure water and brine respectively from temperatures of about 0° C. to temperatures of about 20° C.

A further advantageous application of a heat exchange process in accordance with the present invention is in connection with the separation of crude deposits of sodium nitrate. This is done by cooling a mother liquor in which sodium nitrate is dissolved so as to secure the selective precipitation of the sodium nitrate whilst leaving the other substances which, with the sodium nitrate form part of the crude deposits and are dissolved in the mother liquor, in solution.

For a better understanding of the present invention and to show how the same may be carried out in practice, reference will now be made to the accompanying drawings in which.

Figure 1:
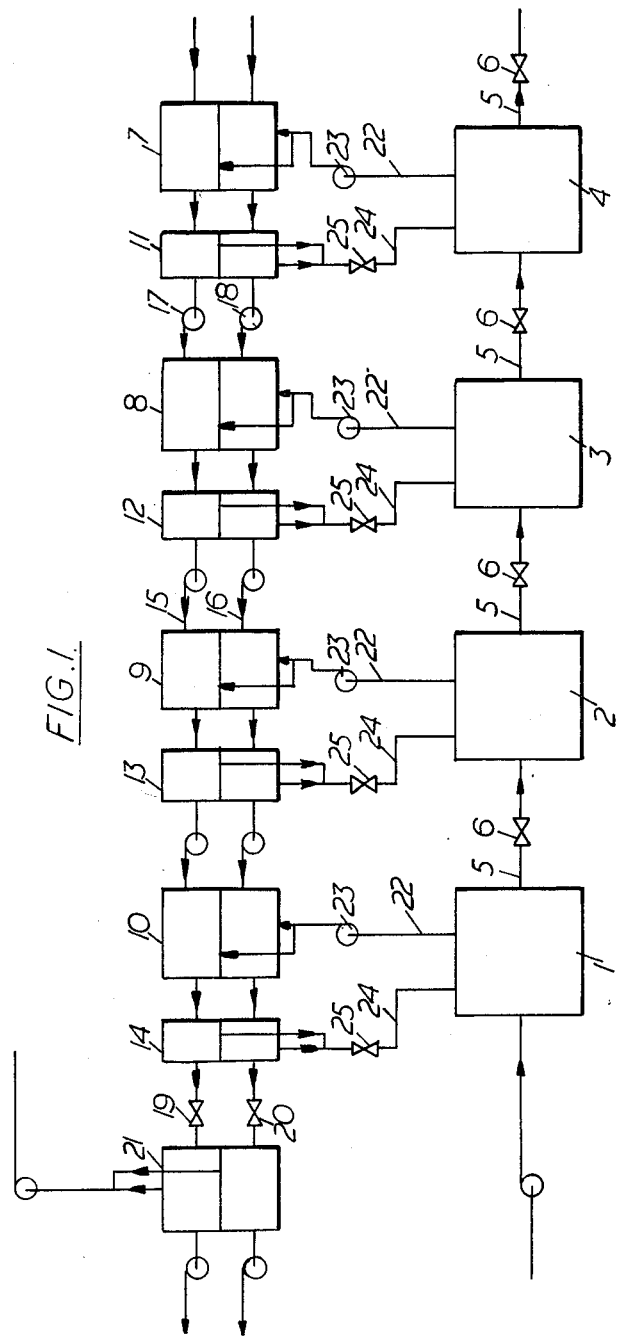
FIG. 1 is a schematic flow sheet illustrating a process in accordance with the invention for cooling sea water prior to its separation into separate streams of pure water and concentrated brine, and for the simultaneous heating of these separate streams of brine and pure water.

In FIG. 1 there is illustrated a heat exchange process in accordance with the invention whereby sea water is cooled in four successive cooling stages from a temperature of 20° C. to a temperature of 0° C. whilst two streams, respectively of brine and pure water, are at the same time heated from 0° C. to about 21° C. The utilization of the so-cooled sea water for the production of the separate streams of pure water and concentrated brine will be described with reference to FIG. 3 and does not, of itself, constitute an embodiment of the present invention.

As shown in FIG. 1, the heat exchange process is carried out in apparatus which comprises four evaporator vessels 1 to 4, in each of which is carried out a separate cooling stage of the system and which are connected in series by means of pipes 5. Communication between adjoining vessels is controlled by means of control valves 6. Associated respectively with these cooling stages are four heating stages comprising respectively four pairs of condenser vessels 7 to 10, each pair of which is associated with a separate pair of four pairs of separator vessels 11 to 14. The four heating stages are coupled together by pipes 15 and 16, pumps 17 and 18 being respectively disposed in the pipes 15 and 16 between successive heating stages. The final pair of separator vessels 14 communicates via the pipes 15 and 16 and control valves 19 and 20 with a pair of butane stripper vessels 21.

Each evaporator vessel is coupled to a corresponding condenser pair via a pipe 22 in which is connected a compressor pump 23. Similarly, each separator vessel is coupled to an associated evaporator vessel via a pipe 24 and a control valve 25.

In operation, sea water is pumped into the first evaporator vessel 1 at a temperature of 20° C. and is passed through each of the four evaporator vessels 1 to 4 in succession, in each evaporator vessel the sea water being brought into intimate thermal contact with isobutane liquid and being cooled by 5° C. as a result of the evaporation of isobutane vapour. The isobutane vapour evaporated from each evaporator vessel is compressed by a compressor pump 23 and is condensed on the two streams of brine and pure water in an associated pair of condenser vessels. As a result of this condensation the temperature of the streams of brine and pure water is raised in each condenser vessel by about 5° C. The so heated streams together with the isobutane vapour condensed thereon are passed from each pair of condenser vessels to a pair of separator vessels wherein the isobutane liquid is separated out and passed back via the pipe 24 and control valve 25 to the associated evaporator vessel. The streams of brine and pure water are thus passed from one heating stage of the system to the next and so finally they are passed via the control valves 19 and 20 to stripper vessels wherein any residual isobutane is removed and the uncontaminated brine and pure water are discharged at a temperature of about 21° C. The residual quantity of isobutane which is removed in the stripper vessel is compressed and returned to the condensers for recirculation.

It will be noted that whereas the incoming temperature of the sea water is given as 20° C. the outgoing temperature of the brine and pure water streams is given as 21° C. The difference is mainly due to the heat equivalent of the work done by the compressors and other equipment. It is reckoned that in order to cool one ton of sea water from 20° to 15° C. the evaporation of about 65 kgs. of isobutane is required.

Figure 2:
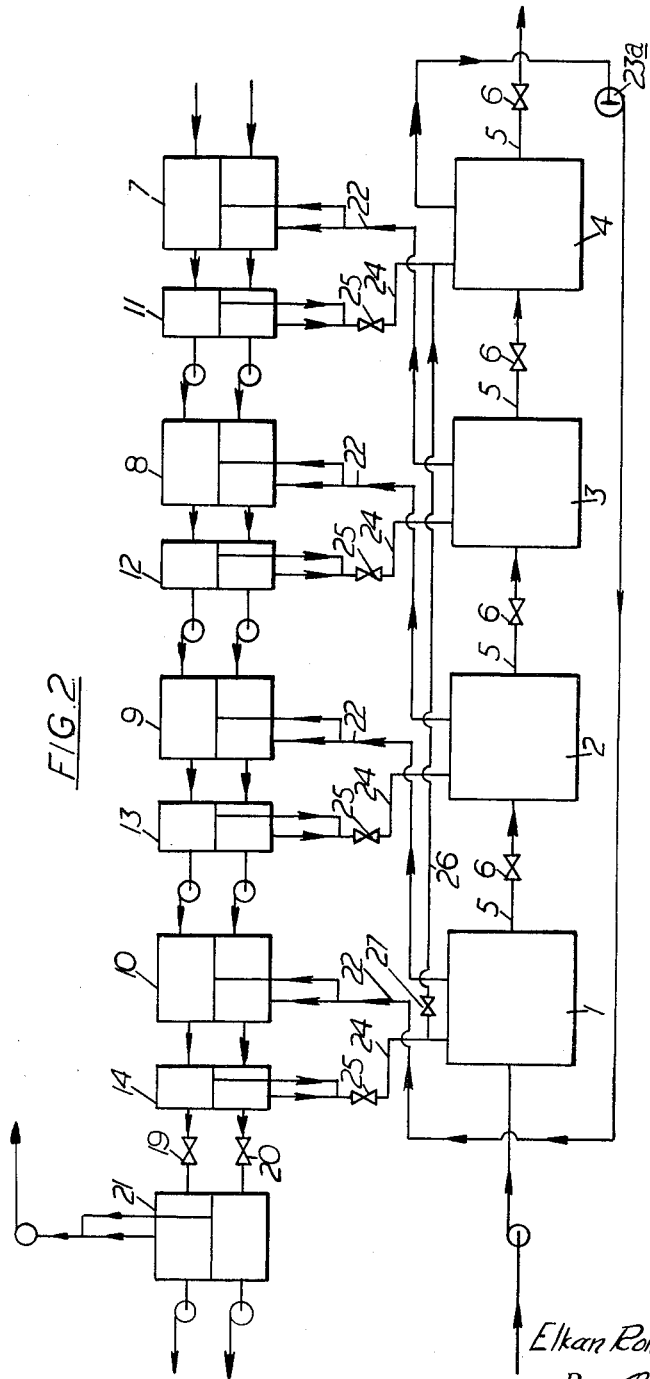
FIG. 2 is a schematic flow sheet illustration of a modification of the process shown in FIG. 1.

In FIG. 2 of the drawings there is illustrated a modification of the process shown in FIG. 1. This modified process is carried out with apparatus which, as before, comprises four evaporator vessels 1 to 4 and four pairs of condenser vessels 7 to 10. In this case however the fluid evaporated at each cooling stage is condensed at a preceding heating stage, i.e., a heating stage whose temperature is lower than that of the cooling stage at which the fluid was evaporated. In view of the fact that the isobutane is condensed at cooler temperatures, the vapours do not require compression before condensation. The vapour however evaporated from the last evaporator vessel 4 does require compression by means of a relatively large capacity compressor 23a prior to its condensation in the condenser vessel pair 10. In this modification it is essential that the isobutane evaporated at every stage except the last should be condensed at a lower temperature than that at which it is evaporated. This requirement necessitates that the cooling at each evaporator stage should be less than the cooling at the final evaporator stage and, similarly, that the heating at each heating stage should be less than the heating at the final stage. Thus, for example, the cooling at each of the evaporator stages 1, 2 and 3 can be by 4½° C. respectively, whilst the cooling at the final evaporator stage 4 will then be by 6½° C. Similarly the heating at heating stages 7, 8 and 9 will be by 4½° C. whilst the heating at the final heating stage 10 will be by 6½° C. In view of the fact that the cooling at the final stage is by a relatively increased amount, it is clear that in addition to the butane supplied from the separators 11, additional butane must be supplied to the final stage and this butane is available from the separators 14 via the line 26. With such a modified process the power requirements are about the same as those in connection with the process described above with reference to FIG. 1, but here four relatively smaller capacity compressors have been replaced by one relatively large capacity compressor.

In the evaporation however of the isobutane from the sea water to be cooled, a certain amount of non-condensable vapours may be given off by the water and may pass with the isobutane vapour to the isobutane compressors. It will be appreciated that in view of the fact that these vapours are not condensable or not readily condensable, the condensers will progressively be filled with an increasing concentration of these vapours or gases. After a time this concentration will become so great as to impair the efficiency of the process. It is therefore necessary to keep the concentration of these vapours in the condensers below a certain maximum level. For this purpose a bleed conduit (not shown in the drawings) can be provided which communicates with the isobutane condenser vessels and which can bleed off a sufficient quantity of uncondensed vapours together with isobutane vapour to keep the concentration of the uncondensed vapour in the condensers below the required maximum. The vapour so bled off is then compressed to a high pressure, say 30 atmospheres, and cooled on the incoming brine and pure water at 0° C. Nearly all the isobutane vapour present will be condensed as liquid whilst the uncondensable vapours can be released to the atmosphere. The uncondensed vapour so released will contain a negligible quantity of isobutane vapour.

Alternatively, the isobutane can be separated from the non-condensable vapours in the bleed stream by adsorption under pressure or refrigeration on active charcoal. After discharging the non-condensable vapours the charcoal can be warmed thereby releasing the isobutane which is returned to the process.

Furthermore, whilst in the arrangements specially described above isobutane is added to each evaporator vessel separately, the total quantity of isobutane liquid to be evaporated over all four stages can be fed into the initial evaporator vessel, the excess isobutane liquid being carried over with the cooled sea water from stage to stage. With such an arrangement the need for having separate return conduits by which the liquid isobutane is returned to each of the evaporators is removed as is the necessity of having individual separators for each stage. On the other hand, such an arrangement leads to a lower cycle efficiency and to the requirement of pumping increased quantities of liquid.

Figure 3:
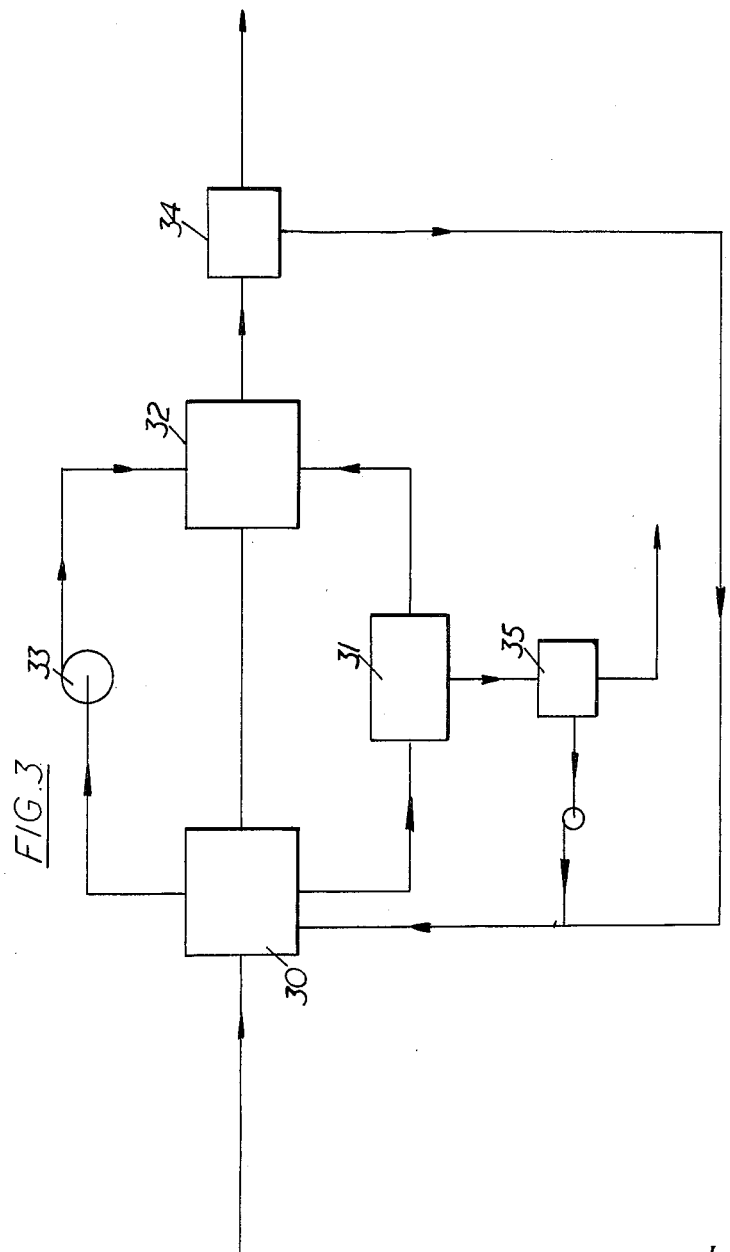
FIG. 3 is a schematic flow sheet illustrating a process, not in accordance with the invention, for separating the sea water which has been pre-cooled by the process illustrated in FIG. 1 into the separate streams of pure water and concentrated brine.

The use of the cooled sea water in the production of the stream of pure water and concentrated brine will now be described with reference to FIG. 3 of the drawings. Here the sea water which has been cooled to a temperature of 0° C. is fed to an evaporator vessel 30 wherein it is intimately contacted with isobutane and upon the evaporation of the isobutane therefrom about one-half of the sea water is frozen and a slurry of ice and concentrated brine is produced at a temperature of −4° C. This slurry is fed to an ice separator 31 in which the solid ice is separated from the concentrated brine solution, the ice being then fed to a condenser vessel 32 in which the major portion of the isobutane vapour evaporated in the evaporator vessel 30 and compressed by a compressor 33 is condensed, thereby melting the ice, the remainder of the isobutane being compressed further and condensed on a suitable stream. The melted ice which consists substantially of pure water together with the condensed isobutane is fed to an isobutane separator 34 where the isobutane is separated from the pure water and the stream of pure water is led off from the isobutane separator 34 whilst the stream of isobutane liquid is fed back from the isobutane separator 34 to the evaporator vessel 30. The concentrated brine solution separated off in the ice separator 31 is fed to a further isobutane separator 35 in which the isobutane associated with the concentrated brine solution is separated out and fed back to the evaporator vessel 30 and the stream of concentrated brine is led out of the further isobutane separator 35.

There is thus produced two separate streams, one of pure water and the other of concentrated brine and both at a temperature of about 0° C. which can be used to flow in countercurrent with the sea water being cooled in the heat transfer process described above with reference to FIG. 1.

Figure 4:
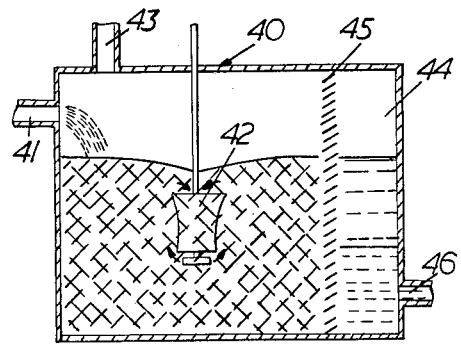
FIGS. 4 to 7 are schematic diagrams showing details of apparatus used in carrying out the process illustrated in FIG. 1.

Referring to FIGS. 4 to 7 of the drawings, there is schematically illustrated various apparatus components which can be used in carrying out the process in accordance with the invention described with reference to FIG. 1 or 2. In FIG. 4 there is shown diagrammatically an evaporator vessel 40 having an isobutane and sea water inlet 41 and a draft tube and impeller arrangement 42 which, in operation, secures the dispersal of the isobutane as small droplets in the water thereby effecting good thermal contact between the isobutane and the water. The isobutane vapour which is evaporated from the mixture is led off through a pipe 43. An end portion 44 of the evaporator vessel 40 is screened from the remainder of the vessel by means of a baffle partition 45, this baffle partition serving to screen the end portion 44 from the effects of the draft tube and impeller arrangement 42. Because of this screening, separation of the isobutane and sea water takes place in the end portion 44 and the so separated sea water can be removed via an outlet pipe 46 An evaporator vessel so constructed permits of the evaporation of large quantities of isobutane without it being cooled more than a few degrees centigrade, preferably less than 1° C. below the temperature of the sea water leaving the evaporator vessel.

Figure 5:
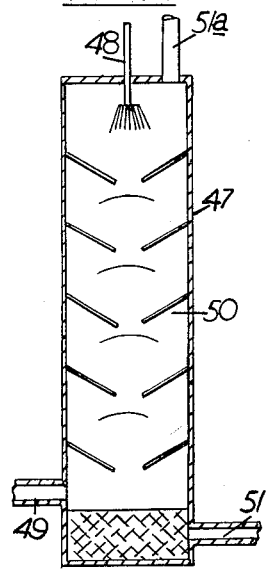

In FIG. 5 there is shown diagrammatically a condenser tower 47 into which a liquid stream (pure water or brine) on to which the vapour is to be condensed is sprayed in through a sprayer 48 whilst isobutane vapour evaporated from the evaporator vessel is introduced via an inlet pipe 49 disposed near the base of the tower. The tower 47 is furthermore provided with staggered baffles 50 which disperse the sprayed-in liquid and thereby secures good contact between the incoming isobutane vapour and the liquid stream. The incoming vapour condenses on the sprayed-in liquid and the condensed vapour and liquid sink to the bottom of the tower where they are removed by the outlet pipe 51. A further outlet pipe 51a is provided through which uncondensable vapours and isobutane vapour can be bled off.

Figure 6:
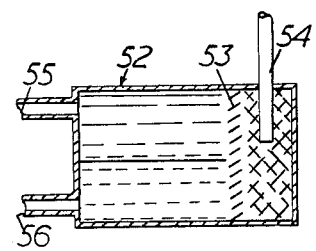

FIG. 6 is a diagrammatic representation of a separator 52 which is divided by means of a baffle screen 53 into an end portion into which water or concentrated brine and isobutane is fed via an inlet pipe 54 and a major portion in which the isobutane and water separate out and are respectively led out of the separator 52 by means of outlet pipes 55 and 56.

Figure 7:
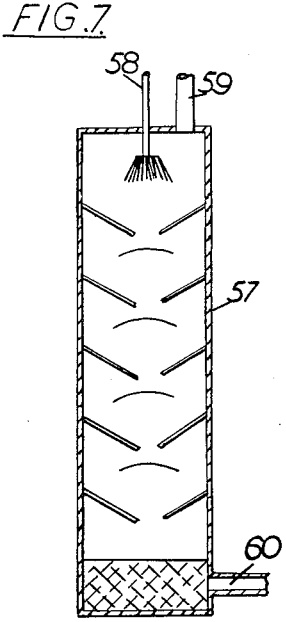

FIG. 7 shows diagrammatically a stripper tower 57 which is of similar design to the condenser tower 47 shown in FIG. 5 and which is used to strip the heated water and brine of any condensed vapour which may still be associated therewith after passage through the separator shown in FIG. 6. The stripper tower 57 is provided with an inlet spray 58 by means of which a stream of brine or water together with associated condensed isobutane liquid is sprayed into the tower. The tower 57 is provided with a butane outlet pipe 59 which is connected to a suction pump (not shown) by means of which a sub-atmospheric pressure is maintained in the stripper tower 57. In consequence of the maintenance of this sub-atmospheric pressure the isobutane vapour evaporates through the outlet pipe 59 whilst the water or concentrated brine is led through an outlet pipe 60.

The remaining apparatus components used in carrying out the process in accordance with the present invention are all substantially of standard type and include liquid pumps and centrifugal compressors for the isobutane vapour.

As has been indicated above, with such a multi-stage heat exchange process the power required to transfer the heat is considerably less than would be the case if the entire transfer were carried out in a single stage. The actual power input required can be calculated on the basis of simple thermodynamic considerations but is also subject to certain other factors such as heat transfer gradients and cycle and compressor efficiency. It can be shown that, when taking into account these considerations, the power input required to cool two tons of sea water from 20° to 0° C. in four stages is roughly equal to one-half the power required to partially freeze that pre-cooled sea water so as to produce one ton of pure water and one ton concentrated brine. On the other hand, if such pre-cooling were carried out in one stage only, the power input involved would be nearly twice that required to freeze the pre-cooled sea water. It will be appreciated that the power input required to effect the heat transfer decreases with an increasing number of stages. On the other hand, an increase in the number of stages carries with it an increase in the total amount of equipment to be used. It would therefore appear that for each set of operating circumstances an optimum number of stages exists for which the economy in power output outweighs the increased costs involved in the extra equipment. It has been found that with the heat exchange process described in connection with the pre-cooling of large quantities of sea water, the capital cost of a four-stage installation is in fact cheaper than the cost of an equivalent one-stage installation despite the increased amount of equipment. This surprising fact arises in view of the fact that with four stages the combined size of the compressors to be used is considerably smaller than with a single stage and this more than compensates for the increased expenditure in the rest of the equipment. However, as the number of stages increases the total expenditure in equipment will increase with further reductions in power costs.

It is clear that the application of a heat exchange process in accordance with the present invention is not solely confined to the pre-cooling of sea water prior to its desalination. Thus, an analogous process can be used to concentrate almost any dilute aqueous solution. Thus, for example, a dilute copper-sulphate solution as produced by the leaching of copper ores by sulphuric acid may be concentrated by freezing out and separating part of the water. In the case of the concentration of any dilute aqueous solution, the pre-cooling of the solution can conveniently be carried out by a heat transfer process in accordance with the invention.

Figure 8:
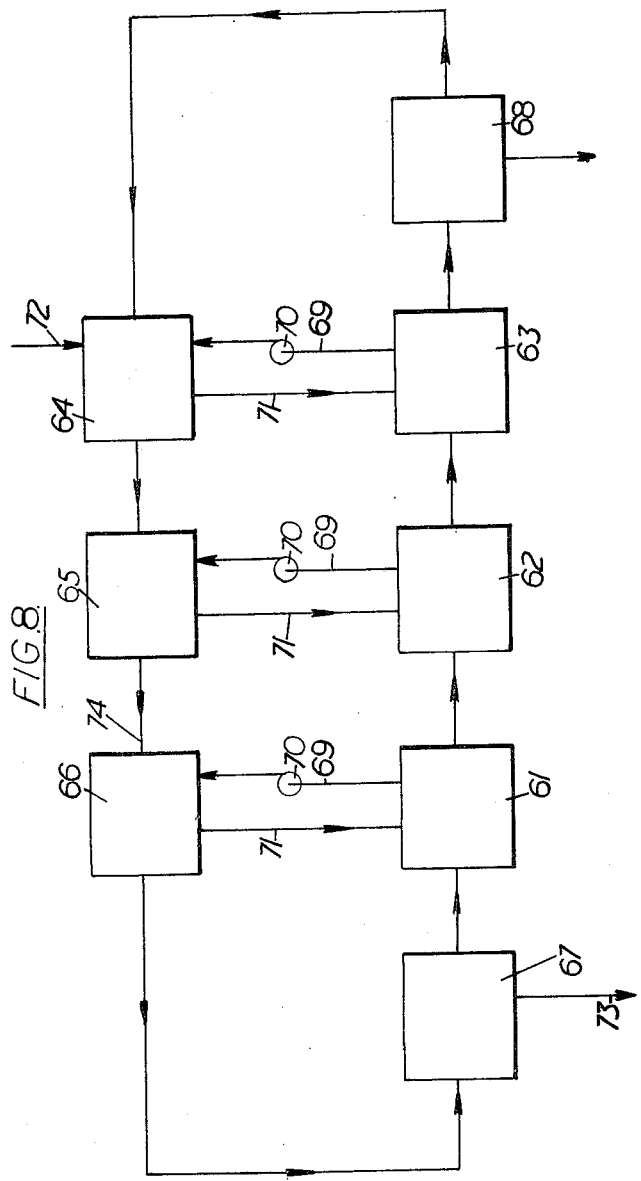
FIG. 8 is a schematic flow sheet illustrating a process in accordance with the present invention for the separation of sodium nitrate from crude deposits.

A further application of a heat exchange process in accordance with the invention will now be described with reference to FIG. 8 of the drawings which is a schematic flow sheet illustrating the separation of sodium nitrate from the crude deposits in which it is obtained. The application of a heat transfer process in accordance with the invention to the problem of the separation of sodium nitrate is based on the known process for effecting this separation wherein, if a saturated aqueous solution of the crude deposits or of these deposits together with suitable additives, is formed at about 35° C., then upon the cooling of this saturated solution sodium nitrate progressively crystallizes out whilst the other salts such as sodium chloride, sodium sulphate, calcium and magnesium sulphates largely remain in solution.

The process is carried out as before in like pluralities of cooling and heating stages. In this case three such stages are employed. The cooling stages consist respectively of three evaporating vessels 61, 62 and 63, and the heating stages consist respectively of three condenser vessels 64, 65 and 66. The condenser vessels 64 to 66 are connected in series via conduits 74 and the output of the final condenser vessel 66 is coupled via a separator 67 to the input of the evaporator vessel 61. The evaporator vessels 61, 62 and 63 are also connected in series and the output of the final evaporator vessel 63 is coupled via a separator 68 to the input of the first condenser vessel 64. Each evaporator vessel is coupled to a corresponding condenser vessel by means of a vapour conduit 69 in which is inserted a compressor pump 70 and by means of a butane liquid conduit 71 through which condensed butane liquid can be fed from the condenser to the corresponding evaporator vessel. In use, the crude deposits which include the sodium nitrate are mixed with cold mother liquor obtained in a later stage of the process and are fed to the first condenser vessel 64 via a feed conduit 72. Here part of the sodium nitrate dissolves and the remainder together with undissolved deposits gets carried over as a slurry to the succeeding condenser vessels 65 and 66 where, as the temperature rises, the solution becomes steadily more concentrated in sodium nitrate whilst in the saturator and separator 67, saturation nears completion and the undissolved solids are removed via conduit 73 leaving a solution rich in sodium nitrate. The solution is now passed in succession through the evaporator vessels where it is cooled in successive stages, by the evaporation therefrom of butane vapour, from a temperature of 35° C. to a temperature of 5° C. The vapour thus evaporated is compressed by the compressors 70 and is condensed in corresponding condenser vessels thereby heating up the liquid passing therethrough. In each of the evaporator vessels sodium nitrate crystallizes out whilst the remaining soluble materials remain for the most part in solution. The crystallized sodium nitrate is carried over as a slurry from evaporator vessel to evaporator vessel until it finally arrives in the separator vessel 68 where it is removed from the mother liquor. The mother liquor is then re-cycled to the initial condenser vessel 64.

It can be shown that some ten tons of slurry have to be cooled for each ton of sodium nitrate produced and that the power requirements for the process are substantially less than if the cooling were done in a single stage.

Whilst in the arrangement just described the crude deposits are mixed with the mother liquor and fed to the first condenser 64, the crude deposits could alternatively be introduced into the cycle in the saturator vessel 67 in which case the total amount of sodium nitrate to be dissolved is dissolved in a single stage at a temperature of 35° C.

Whilst in the processes specifically described above the liquid which is vaporized is n-butane or isobutane, other suitable liquids may be employed such as, for example, propane, n-pentane, a branched pentane or a chlorofluoro compound such as dichlorodifluoromethane, the requirement for such liquid being that it should have a much higher vapor pressure than water and should have a low or substantially zero miscibility with water and should be chemically inert with respect to the substance to be cooled and heated.

I claim:

1. A heat exchange process for the cooling of a first aqueous liquid in at least two cooling stages and for the heating of a second aqueous liquid in at least two heating stages, the overall cooling and heating being over ranges of at least five centigrade degrees and between substantially equal temperature levels, comprising the steps of placing a volatile water-immiscible refrigerant fluid into intimate thermal contact with said first aqueous liquid, evaporating volatile fluid from the first liquid in a first cooling stage thereby cooling the first liquid to a first lower temperature level, passing the first liquid from the first cooling stage to a second cooling stage, evaporating further volatile fluid from the first liquid in the second cooling stage thereby cooling the first liquid to a second lower temperature level, condensing the volatile fluid from one of said cooling stages on the second liquid in a first heating stage thereby heating the second liquid to a first higher temperature level, passing the second liquid from the first heating stage to a second heating stage, condensing the evaporated volatile fluid from the other of said cooling stages on the second liquid in the second heating stage thereby heating the second liquid to a second higher temperature level, separating the condensed fluid from the second liquid and returning the separated fluid to the cooling stages.

2. A heat exchange process according to claim 1, wherein the vapour is compressed prior to its condensation.

3. A heat exchange process according to claim 1, wherein the condensed volatile fluid is separated from the second liquid at each stage and returned to a corresponding cooling stage.

4. A heat exchange process according to claim 1, wherein the total quantity of volatile fluid to be evaporated at all the cooling stages is added to the first cooling stage, the residual unevaporated fluid being carried over with the first liquid from cooling stage to cooling stage.

5. A heat exchange process according to claim 1, wherein the vapour evaporated at each cooling stage except the final cooling stage is condensed at a heating stage which is at a lower temperature than that of the cooling stage at which the vapour has been evaporated, whilst the vapour evaporated at the final stage is compressed and condensed at a higher temperature than the temperature of the final cooling stage.

6. A heat exchange process according to claim 1, wherein the aqueous solution is constituted by saline water.

7. A heat exchange process according to claim 1, wherein the first liquid is constituted by a solution of sodium nitrate in mother liquor, the passage of the mother liquor through the cooling stages resulting in the precipitation from the mother liquor of sodium nitrate crystals, the second liquid being also constituted by mother liquor which is cycled after passage through the heating stages into the cooling stages and, after removal of sodium nitrate crystals precipitated in the cooling stages, to the heating stages, crude deposits including sodium nitrate being fed to the mother liquor and undissolved salts being removed from the mother liquor prior to its being cooled.

8. A heat exchange process according to claim 1, wherein the volatile fluid is constituted by one of the following propane, n-butane, isobutane, n-pentane, a branched pentane or dichlorodifluoromethane.

9. A heat exchange process for the cooling of a first aqueous liquid in at least two cooling stages and for the heating of a second aqueous liquid in at least two heating stages, the overall cooling and heating being over ranges of at least five centigrade degrees and between substantially equal temperature levels, said process comprising the steps of placing a first quantity of a volatile water-immiscible refrigerant fluid into intimate thermal contact with said first aqueous liquid, evaporating said volatile fluid from the first liquid in a first cooling stage thereby cooling the first liquid to a first lower temperature level, passing the first liquid from the first cooling stage to a second cooling stage, placing a second quantity of said volatile fluid into intimate thermal contact with said first liquid, evaporating the volatile fluid from the first liquid in the second cooling stage thereby cooling the first liquid to a second lower temperature level, condensing the evaporated volatile fluid from the second cooling stage on the second liquid in a first heating stage thereby heating the second liquid to a first higher temperature level, separating the condensed fluid from the second liquid and returning the separated fluid to said second cooling stage, passing the second liquid from the first heating stage to a second heating stage, condensing the evaporated volatile fluid from the first cooling stage on the second liquid in the second heating stage thereby heating the second liquid to a second higher temperature level, and separating the condensed fluid from the second liquid and returning the separated fluid to said first cooling stage.

10. A heat exchange process for the cooling of a first aqueous liquid in at least two cooling stages and for the heating of a second aqueous liquid in at least two heating stages the overall cooling and heating being over ranges of at least five centigrade degrees and between substantially equal temperature levels, said process comprising the steps of placing a first quantity of a volatile water-immiscible refrigerant fluid into intimate thermal contact with said first aqueous liquid, evaporating said volatile fluid from the first liquid in a first cooling stage thereby cooling the first liquid to a first lower temperature level, passing the first liquid from the first cooling stage to a second cooling stage, placing a second quantity of said volatile fluid into intimate thermal contact with said first liquid, evaporating the volatile fluid from the first liquid in the second cooling stage thereby cooling the first liquid to a second lower temperature level, condensing the evaporated volatile fluid from the first cooling stage on the second liquid in a first heating stage thereby heating the second liquid to a first higher temperature level, the temperature at which said volatile fluid is condensed in said first heating stage being lower than that at which said volatile fluid was evaporated in said first cooling stage, separating the condensed fluid from the second liquid and returning the separated fluid to said first cooling stage, passing the second liquid from the first heating stage to a second heating stage, compressing and condensing the evaporated volatile fluid from the second of said cooling stage on the second liquid in the second heating stage thereby heating the second liquid to a second higher temperature level, the temperature at which said volatile fluid is condensed in said second heating stage being higher than that at which said volatile fluid was evaporated in said second cooling stage, and separating the condensed fluid from the second liquid and returning the separated fluid to said second cooling stage.

11. In the separation of substantially pure water from brine by the formation, separation and melting of ice crystals, a heat exchange process for the cooling of brine in a plurality of successive cooling stages preliminary to the formation of the ice crystals and the heating of the water in a corresponding number of successive heating stages subsequent to the melting of the ice crystals, the overall cooling and heating being between substantially equal temperature levels, said process comprising the steps of placing a volatile water-immiscible refrigerant fluid into intimate thermal contact with said brine, evaporating said volatile fluid from said brine in a first cooling stage thereby cooling the brine to a first lower temperature level, passing the brine from the first cooling stage to a second cooling stage, evaporating further volatile fluid from the brine in the second cooling stage thereby cooling the brine to a second lower temperature level, condensing the evaporated volatile fluid from one of said cooling stages on the water in a first heating stage thereby heating the water to a first higher temperature level, passing the water from the first heating stage to a second heating stage, condensing the evaporated volatile fluid from the other of said cooling stages on the second liquid in the second heating stage thereby heating the water to a second higher temperature level, separating the condensed fluid from the second liquid and returning the separated fluid to the cooling stages.

References Cited by the Examiner

UNITED STATES PATENTS 2,821,304   5/58   Zarchin _____ 62—123

FOREIGN PATENTS 217,766   3/58   Australia.
841,374   7/60   Great Britain.

OTHER REFERENCES

Gilliland: Ind. and Eng. Chem., vol. 47, #12, December 1955, pages 2410 to 2422.

NORMAN YUDKOFF, *Primary Examiner.*

GEORGE D. MITCHELL, ANTHONY SCIAMANNA, MAURICE A. BRINDISI, *Examiners.*